(12) United States Patent
Schaad et al.

(10) Patent No.: US 7,689,562 B2
(45) Date of Patent: Mar. 30, 2010

(54) ACCESS CONTROL SYSTEM, A RULE ENGINE ADAPTOR, A RULE-BASED ENFORCEMENT PLATFORM AND A METHOD FOR PERFORMING ACCESS CONTROL

(75) Inventors: Andreas Schaad, Bad Pymont (DE); Pascal T. C. Spadone, Antibes (FR)

(73) Assignee: SAP AG, Walldorf (DE)

( * ) Notice: Subject to any disclaimer, the term of this patent is extended or adjusted under 35 U.S.C. 154(b) by 442 days.

(21) Appl. No.: 11/712,280

(22) Filed: Feb. 27, 2007

(65) Prior Publication Data

US 2007/0203881 A1  Aug. 30, 2007

(30) Foreign Application Priority Data

Feb. 27, 2006  (EP) .................................. 06290341

(51) Int. Cl.
*G06F 17/30* (2006.01)
(52) U.S. Cl. .................. 707/9; 707/1; 707/10; 707/100
(58) Field of Classification Search ...................... 707/1, 707/9, 10, 100, 102; 713/167
See application file for complete search history.

(56) References Cited

U.S. PATENT DOCUMENTS

| | | | |
|---|---|---|---|
| 6,058,387 A * | 5/2000 | Campbell et al. | 706/60 |
| 6,513,059 B1 * | 1/2003 | Gupta et al. | 709/202 |
| 6,560,592 B1 | 5/2003 | Reid et al. | |
| 7,185,192 B1 * | 2/2007 | Kahn | 713/155 |
| 2006/0047657 A1 * | 3/2006 | Frieder et al. | 707/9 |

FOREIGN PATENT DOCUMENTS

EP      1032188      8/2000

(Continued)

OTHER PUBLICATIONS

Kern, A., et al., "Rule support for role-based access control", *Proceedings of the Tenth ACM symposium on Access Control Models and Technologies*, Stockholm, Sweden,(2005), 130-138.

(Continued)

*Primary Examiner*—Cam-Linh Nguyen
(74) *Attorney, Agent, or Firm*—Schwegman, Lundberg & Woessner, P.A.

(57) ABSTRACT

An access control system provides access control to at least one information resource associated with at least one application within a computer network. The system comprises a plurality of context sources being relevant for the at least one application and providing context information, a constraint specification console providing an interface to specify application specific constraints based on the context sources, a rule engine capable of handling facts and applying inference rules on those facts, an application specific constraint enforcement point configured for receiving access requests, hence querying facts and further being responsible for making access decisions regarding the information resource based on those facts and on application specific constraints and a rule engine adaptor acting as intermediary in communication of the rule engine with the context sources, the constraint specification console and the enforcement point, respectively, so as to allow access control to the at least one information resource based on specified application specific constraints with regard to context information originating from the context sources.

16 Claims, 5 Drawing Sheets

FOREIGN PATENT DOCUMENTS

| WO | WO-02093445 | 11/2002 |
| WO | WO-03001373 | 1/2003 |

OTHER PUBLICATIONS

Ceri, S , et al., "Rules in database systems", *ACM Computing Surveys*, vol. 28, 1996 (*also The Computer Science and Engineering Handbook,* 1997), 1142-1157.

Chomicki, J , et al., "Monitors for History-Based Policies", *Proceedings of the International Workshop on Policies for Distributed Systems and Networks,* Lecture Notes In Computer Science; vol. 1995, (2001), 57-72.

Knorr, K, et al., "Analyzing Separation of Duties in Petri Net Workflows", *Lecture Notes in Computer Science,* vol. 2052, Proceedings of the International Workshop on Informatiobn Assurance in Computer Networks: Methods, Models, and Architectures for Network Security,(2001), 102-114.

\* cited by examiner

ACCESS CONTROL SYSTEM, A RULE ENGINE ADAPTOR, A RULE-BASED ENFORCEMENT PLATFORM AND A METHOD FOR PERFORMING ACCESS CONTROL

CLAIM OF PRIORITY

The present patent application claims the priority benefit of the filing date of European Application (EPO) No. 06290341.4 filed Feb. 27, 2006, the entire content of which is incorporated herein by reference.

TECHNICAL FIELD

This description relates generally to the field of access control to an information resource, and more particularly to an access control system, a rule engine adaptor and a rule-based enforcement platform applicable for access control. Furthermore, this description refers to a method for performing access control to at least one information resource associated with at least one application within a computer network.

DESCRIPTION OF THE RELATED ART

In general, access control to an information resource is based on a reference monitor evaluating an access request against a static set of access rights associated to a principle or role. However, context information may also be taken into consideration to decide whether access should or should not be granted. Such context may be the operations a user has already executed in a workflow, the business objects he accessed in the past but also more abstract context like temperature or location. This, however, raises a set of problems that no current systems appears to address satisfactorily.

Concepts described in the prior art have mostly only been referred to in the different context of policy-based distributed systems or network management. A. Kern and C. Wahldorf, "Role support for role-based access control", presented at ACM Symposium on Access Control Models and Technologies, Stockholm, Sweden, 2005 describes the use of the JESS rule engine for specification and evaluation of constraints in the context of an access right management system. However, the approach is limited to static context information like organizational units of an employee. The approach of Kern et al. also does not show how independent applications can be connected at the same time. Further, the approach is based on using very specific software for managing the constraints.

J. Chomicki and J. Lobo, "Monitors for History-Based Policies", Policies for Distributed Systems and Networks, Vol. 1995, 2001 discloses a rule-based approach which is used for specifying and evaluating dynamic policies. The paper focuses on the computation of rules, but does not consider the overall architecture that would allow different applications to be connected and context information to be converted.

S. Ceri and R. Ramakrishnan, "Rules in data-based systems", ACM Computing Surveys, Vol. 28, 1996 looks at rules in data base systems. This paper only focuses on a single, homogeneous database and only looks at static rules like monetary constraints.

K. Knorr and H. Weidner, "Analyzing Separation of Duties in Petri Net Workflows", Lecture Notes in Computer Science, Vol. 2052, 2001 uses a rule-based approach to specify separation of duty rules in the context of workflow systems. This paper relates to aspects and does not provide any information on how constraints may realistically be enforced in the context of heterogeneous applications.

Regarding existing commercial systems, the BEA workflow solution suite can be cited. This solution provides a rule specification functionality, but only in a proprietary and a system dependant fashion. The solution does not appear to provide explicit functionality to deal with dynamic context information based on heterogeneous and independent applications. The rules of the system are strictly procedural and do not foresee a choice about the rule engine that is used.

A further commercial system is iLog. This system only provides a generic rule engine to be used by application developers as they wish.

There are certain open questions that are still not answered satisfactorily within the cited prior art. No answer is given, for example, to the question, how different context data from legacy or external applications can be gathered and represented in a uniform manner. Furthermore, it is open how access constraints based on such context data can be specified and evaluated irrespective of the access control system of a specific target application. Furthermore, it is still to be answered how such access constraint evaluation results can finally be presented to an application specific security constraint enforcement point which is ultimately responsible for deciding about access to a certain information resource.

DETAILED DESCRIPTION

According to one example aspect, an access control system providing access control to at least one information resource associated with at least one application within a computer network is proposed. The access control system comprises a plurality of context sources being relevant for the at least one application and providing context information, a constraint specification console providing an interface to specify application specific constraints based on the context sources, a rule engine capable of handling facts and applying inference rules on those facts, an application specific constraint enforcement point capable for receiving access requests, hence querying facts and being responsible for making access decisions regarding the information resource based on those facts and on application specific constraints, and a rule engine adaptor acting as connecting component for interconnecting the rule engine with the context sources, the constraint specification console and the constraint enforcement point, respectively, and as intermediary in communication of the rule engine with the context sources, the constraint specification console and the constraint enforcement point, respectively, so as to allow access control to the at least one information resource based on specified applications specific constraints with regard to context information originating from the context sources.

It is possible, for example that the application corresponds to a task management application. In such a case, it could be desirable to enforce dynamic separation of duty properties in the task management application. The information resource associated with the application to which access control is to be provided is to be understood in a broad sense. In the mentioned example of the task management application, the information resource can be described as a pool of tasks which can be assigned to different workflows. One aspect can be used, for example, to allow/deny a user to perform a given task, based on the history of the tasks he has performed in the past.

Any other application which needs to be managed by taking into account any application relevant context information or which benefits from such a management can make use of at least some aspects. Whenever policies within one organizational domain are to be enforced, at least some aspects could be used. One focus can be seen in an enforcement of constraints at a target application via the constraint enforcement point.

Within the scope of the present specification and claims, a rule engine is to be understood as a system that helps managing coordination rules, such as for example business rules. The rules a business follows may come for instance from a company policy, such as for example "All customers that buy more than $100 at one time will receive a 10% discount", or from other sources such as a security policy. The rule engine, among other functions, may infer some rules based on other rules, and relate some of these rules to information technology applications that are affected or need to enforce one or more of the rules. A fact is any statement that describes a current state of the system; for instance, "Customer John Smith purchased an iPod for 200 euros". For the present disclosure, facts are any context information relevant to the at least one application using any aspect of the present disclosure. Facts are to be asserted into the rule engine's fact base in order to reflect changes in the state of the system, and the rule engine will react to those facts by firing the rules that match these facts, if any.

By means of the rule engine, it is possible to specify constraints programmatically, using the rule engine language via the constraint specification console, and hence to specify constraints such as, for instance, "a user must not transfer a check to the bank if he has issued it and signed it".

Another aspect provides a rule engine adaptor applicable for access control to at least one information resource associated with at least one application within a computer network. The rule engine adaptor acts as intermediary in communication between a rule engine and various application specific context sources and an application specific constraint enforcement point, respectively. The rule engine adaptor further comprises the following components:
a. a context converter component providing an access to the rule engine adaptor for the various context sources which provide context information, and acting as intermediary in communication of the rule engine with any one of the context sources,
b. a constraint converter component acting as intermediary in communication of the rule engine with a constraint specification console which provides an interface to specify application specific constraints based on the context sources so as to enable the rule engine to enforce constraints when the context sources update their respective context information, and
c. a query converter component providing an access to the rule engine adaptor for the constraint enforcement point and acting as intermediary in communication of the rule engine with the constraint enforcement point so as to enable the constraint enforcement point to make access decisions based on application specific constraints in reaction to a certain query.

According to another aspect, a rule-based enforcement platform applicable for access control to at least one information resource associated with at least one application within a computer network is provided. The platform comprises a rule engine being capable of handling facts and applying inference rules on those facts, a constraint specification console providing an interface to specify application specific constraints based on agreed-upon application specific context sources, and a rule engine adaptor providing an access point to the constraint specification console so as to be capable of forwarding constraints specified within the constraint specification console to the rule engine so that the constraints get stored in the rule engine as a set of rules, uniform access for application specific context sources to access the platform so as to enable them to communicate with the rule engine such that context information provided by the context sources can be expressed as facts within the rule engine and an access point for an application specific constraint enforcement point to access the platform so as to allow access control to the at least one information resource based on the application specific constraints with regard to context information originating from the context sources.

Another aspect features a method for performing access control to at least one information resource associated with at least one application within the computer network. The method comprises the following operations:
a. identifying application relevant context sources at application design time;
b. specifying by means of a constraint specification console constraints based on context information that will be provided at runtime by the identified relevant context sources;
c. translating by means of a rule engine adaptor the specified constraints into rules understandable by an appropriate rule engine;
d. translating at runtime by means of the rule engine adaptor context information originating from the identified relevant context sources into facts that can be interpreted and appropriately correlated with the respective rules by the rule engine;
e. querying such facts, in case of need, by means of an application specific constraint enforcement point from the rule engine via the rule engine adaptor so as to enable the constraint enforcement point to make appropriate enforcement decisions.

Implementations make it possible to harmonize and to provide a common way of representing heterogeneous, legacy application context for evaluating access decisions. Furthermore, a centralized but application independent specification of access constraints can be allowed. A centralized but application independent evaluation of system context and constraints using a rule-based approach is possible. Furthermore, the evaluation results are converted into a format allowing an application specific security constraint enforcement point to decide about an access request.

Within the scope of the present specification, an information resource defines any resource associated with an application which wants to use any implementation for which an access control makes sense.

In a possible implementation of the described access control system, the rule engine adaptor is capable for translating context information from any one of the context sources into facts that can be interpreted and appropriately correlated with rules by the rule engine.

Moreover, it is possible that the rule engine adaptor is also capable for translating constraints forwarded by the constraint specification console into rules that can be interpreted and appropriately applied on facts by the rule engine.

The rule engine adaptor can be regarded as a component of the access control system, which provides a common abstraction layer above the rule engine and a common way for all context source types to get in contact with the rule engine. The rule engine adaptor is responsible for translating context information of the context sources as well as constraints specified by the constraint specification console to facts and rules into a language interpretable by the rule engine.

In a further implementation of the access control system the rule engine adaptor is capable for translating queries about facts queried by the constraint enforcement point into a representation that is interpretable by the rule engine and also to translate answers to such translated queries provided by a rule engine into a representation that is interpretable by the constraint enforcement point accordingly.

The rule engine adaptor can provide uniform communication interfaces for the plurality of context sources, the constraint specification console, the constraint enforcement point and the rule engine, respectively, to access the rule engine adaptor accordingly.

According to a further implementation of the access control system the rule engine is an off-the-shelf component, particularly JESS, comprising a fact base for storing facts representing context information originating from the context sources and a rule base for storing rules representing constraints specified and forwarded by means of the constraint specification console. Generally, the rule engine to be used has not to be specified for access control but only has to be capable of handling facts and applying inference rules on those facts. Within the access control system according to a possible embodiment such a rule engine is used in such a way that context information originating from the various context sources is represented as facts within the rule engine's fact base. In addition, security constraints specified by means of the constraint specification console are ultimately expressed as rules within the rule engine. For that reasons, the rule engine adaptor used within the proposed access control system is responsible for translating such context information as well as constraints to facts and rules into the language interpreted by the rule engine. The language of the rule engine is a computer programming language to be used in order to describe what the rule engine should do. In particular, it is the programming language in which rules have to be expressed so that the rule engine can understand them and enforce them. Each rule engine comes with its own rule language. In the case of JESS, for example, a rule expressed as "All customers that buy more than $100 at one time will receive a 10% discount" in English language could be translated as "(customer-order(order-number ?n)(total-price ?p:>100))=>(assert(apply-discount (order-number ?n) (percent 10)))" in JESS's rule engine language.

The rule engine adaptor can be completely application independent and represent a common abstraction layer above the rule engine and a common way for all relevant components specific for a certain application to access the rule engine adaptor.

The components which compose the rule-based enforcement platform provided by a possible implementation are generally also application independent. That means that any application that will use the proposed enforcement platform will use these components as such. Besides the rule engine which can be an off-the-shelf component that is capable of handling facts and applying inference rule on those facts, the enforcement platform comprises a constraint specification console and a rule engine adaptor. The rule engine adaptor can be of the same type as described above. It can be formed accordingly of three sub-components, namely a context converter component, a constraint converter component and a query converter component.

The context converter component represents an access point into the rule-based enforcement platform for the various application specific context sources. Moreover, this access point is uniform; that is, all context sources use the same communication application programming interface (API) to access the rule-based enforcement platform and update their respective context information. The context converter component provides that API. In addition, the context converter component is responsible for translating calls to this API from any one of the context sources into a representation that can be interpreted by the rule engine. That means that the context converter component is responsible to translate context information originating from any one of the context sources into facts that can be interpreted and appropriately correlated with respective rules by the rule engine. The rule engine has a specific fact assertion language into which the context information has to be translated. The fact assertion language is a subset of the rule engine language which has been explained before. The fact assertion language is used to assert facts into the rule engine's fact base. In the case of JESS, fact assertion language expressions are of the form "(assert (<fact-name> (<fact-parameter1-name> <fact-paramter1-value>) . . . ).

The constraint converter component works together with the constraint specification console. Its role is to forward constraints specified by means of the constraint specification console to the rule engine so that those constraints can be enforced by the rule engine when the context sources update their respective context information.

The query converter component makes a link between the application specific constraint enforcement point and the rule engine. The query converter component provides an API for the application specific constraint enforcement point to query about certain types of facts. These types of facts correspond to facts that make sense for the particular at least one application that uses the rule-based enforcement platform in order to enforce suitable constraints. The query converter component is responsible for translating those queries into a representation that is understandable by the rule engine. That means that those queries have to be translated in the rule engine's query language. The query language is another subset of the rule engine language. The query language is used to query facts from the engine's fact base. In the case of JESS, query expressions are of the form "(run-query <query-name> <query-parameter1-value>. . . ). In addition, the query converter component is also responsible for translating answers to such translated queries coming back from the rule engine into a data structure that is understandable by the application specific constraint enforcement point.

Besides the rule engine adaptor the rule-based enforcement platform also comprises a constraint specification console. The constraint specification console is a component that enables an application developer especially that one which is responsible for expressing security constraints to specify appropriate constraints based on agreed-upon context sources. This constraint specification console provides an interface to specify those constraints in the rule engine's rule language. Then the constraint specification console forwards those constraints to the rule engine adaptor so that the constraints get stored into the rule engine as a set of rules.

The components of the at least one application which wants to use the rule-based enforcement platform provided by an implementation or which is part of the access control system of a further embodiment sit on top of the rule-based enforcement platform and use that platform for specifying and enforcing application specific constraints, as for example security constraints. These application specific components must be provided by the at least one application that uses the rule-based platform in order to communicate with it. These application specific components are of two types.

On the one hand there are context sources which are application specific components that provide context information to the rule-based enforcement platform. What type of context information should the constraints be based on is application specific and has to be decided by a designer of the at least one application. Every context source component has to be programmed in such a way that it can communicate with the context converter component as part of the rule engine adaptor which in turn can be part of the rule-based enforcement platform provided by one aspect. Such a communication can be realized in a uniform manner by using an appropriate communication API.

A constraint enforcement point is also an application specific component that is responsible for making appropriate access decisions, as for example security decisions, such as for instance granting or denying access to some resource, based on the application specific constraints that were specified during the design of the at least one application. In order to make such decisions, the constraint enforcement point communicates with a query converter component of the rule engine adaptor. The constraint enforcement point delegates the decision to the rule-based enforcement platform via queries to the query converter component of the rule engine adaptor which is incorporated in the rule-based platform. Such communication with the query converter component is achieved in a uniform manner by using an appropriate communication API.

Summarized, an overall architecture of the access control system provided by an implementation of the present disclosure incorporating a rule-based enforcement platform according to an embodiment and/or a rule engine adaptor according to another embodiment will be described in the following.

At design time, that is the time at which the at least one application is designed, the context sources being relevant for the at least one application are identified and relevant constraints are agreed upon by system designers, a security administrator connects to the constraint specification console and specifies security constraints based on context information that will be provided at runtime by the identified relevant context sources. These constraints are translated by the rule engine adaptor into rules understandable by the underlying rule engine.

At deploy time, that is the time at which a system administrator deploys the at least one application on some production server, a system administrator specifies for instance by means of an appropriate configuration file which context sources are to be connected to the rule engine adaptor. This list of relevant sources has been decided during design time by the corresponding application designers.

At runtime, that is the time at which the context evolves and the system is enforcing security constraints based on that context information, the rule engine adaptor translates context information originating from various relevant context sources into facts understandable by the rule engine, and hence facts representing current context information are stored in the rule engine's fact base. The addition of new facts representing changes in context information fires rules that were specified at design time, as explained above. These rules in turn generate new facts representing information needed to enforce the constraints. The application specific constraint enforcement point via the rule engine adaptor queries such facts in order to make enforcement decisions.

In another aspect a computer program product is provided with a computer-readable medium and a computer program stored on the computer-readable medium with a program code which is suitable for carrying out a method according to one aspect when the computer program is run on a computer.

In another aspect refers to a computer program with a program code which is suitable for carrying out a method according to a further aspect when the computer program is run on a computer.

The computer-readable medium with a computer program stored thereon is provided by another embodiment the computer program comprises a program code which is suitable for carrying out a method as described herein when the computer program is run on a computer.

Further features and possible implementations will become apparent from the description and the accompanying drawings.

For purposes of clarity, the present discussion refers to an abstract example of an access control system. However, the method and the system provided by possible implementations may operate with a variety of types of network systems including networks and communication systems different from the specific example illustrated in the following drawings.

It should be understood that while the following is described in terms of a specific system, that applications in a variety of communication systems, such as advanced cable-television systems are possible, advanced telephone networks or any other communication systems that would benefit from the system or the method according to implementations of the present disclosure. It is intended that the system used in the specification and claims is reached to cover any information and communication system unless the context requires otherwise.

Several implementations are schematically illustrated in the drawings by way of an example and are explained in detail with reference to the drawings. It is understood that the description is in no way limiting on the scope of the present disclosure and is merely an illustration of possible implementations.

Figure 1:
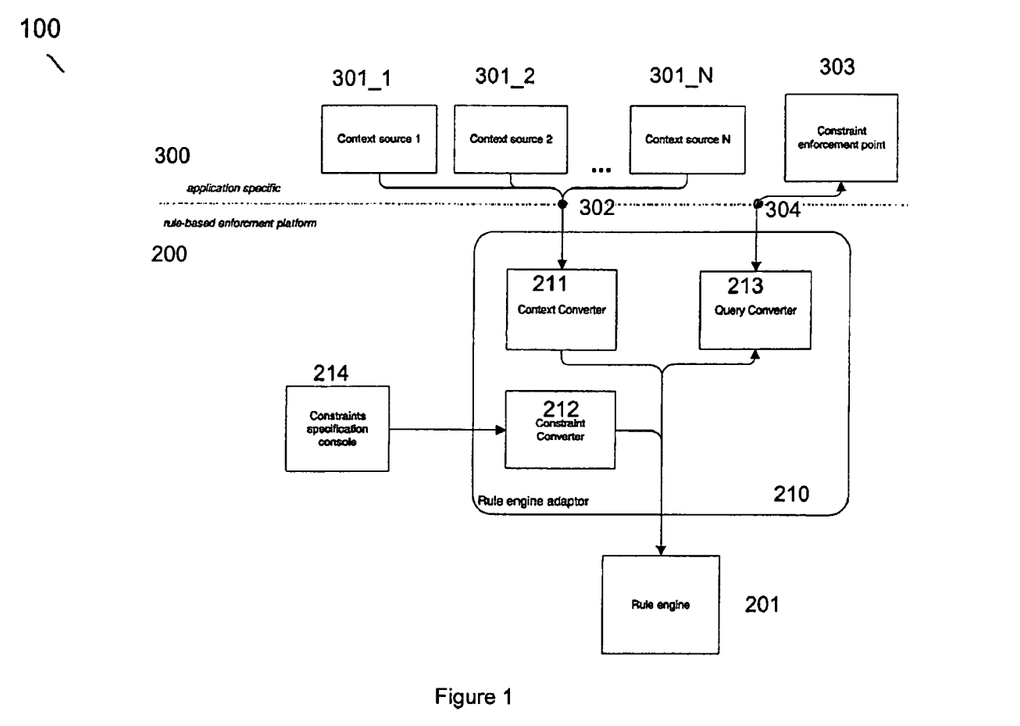
FIG. 1 shows a schematic architecture of a possible embodiment of the access control system according to one aspect.

FIG. 1 shows a possible overall architecture of an access control system 100. Generally, the access control system 100 can be separated into two subsystems. One of the subsystems corresponds to a rule-base enforcement platform 200 and the second subsystem comprises application specific components which are associated with an application which intends to use the rule-based enforcement platform 200 for performing access control to at least one information resource associated with the application. The application specific components of the application specific subsystem 300 sit all on top of the rule-based enforcement platform 200 and intend to use the platform 200 for specifying and enforcing application specific constraints, particularly security constraints. The application specific components are generally provided by the application that intends to use the rule-based enforcement platform 200 in order to communicate with it. These components can be divided into two types. The application which wants to use the rule-based enforcement platform 200 comprises a plurality of context sources 301, namely context source 301_1, context source 301_2, . . . , context source 301_N. The context sources 301 provide context information to the rule-based enforcement platform 200. What type of context information should constraints to be specified be based on, is application specific, and has to be decided by a designer of the corresponding application. Every context source 301 has to be programmed in such a way that it can communicate with the rule-based enforcement platform 200. This can be achieved in a uniform manner by using an appropriate communication API 302. A further application specific component is represented by a constraint enforcement point 303. The constraint enforcement point 303 is an application specific component that is responsible for making appropriate access decisions, particularly security decisions, such as for instance granting or denying access to some information resource associated with the application. Such decisions should be based on application specific constraints which have to be specified during the design of the corresponding application. In order to make such decisions, the constraint enforcement point 303 communicates with the rule-based enforcement platform 200 via an interface 304.

The rule-based enforcement platform 200 is composed of several components which are generally application-independent.

One of the application-independent components is a rule engine 201. The rule engine 201 can be chosen as an off-the-shelf component, as for example JESS, that is capable of handling facts and applying inference rules on those facts. The rule engine 201 is used in such a way that context information provided by anyone of the context sources 301 is represented as facts within the rule engine's fact base. A fact is, as already explained before, any statement that describes a current state of the system; for instance, "Customer John Smith purchased an iPod ® for 200 euros". Within the present disclosure, facts are any context information relevant to the at least one application using any aspect described herein. Facts are to be asserted into the rule engine's fact base in order to reflect changes in the state of the system, and the rule engine will react to those facts by firing the rules that match these facts, if any.

Furthermore, application specific access constraints, as e.g. security constraints, should also be ultimately expressed as rules within the rule engine. The rules a business follows may come for instance from a security policy, such as for example "All employees that have no specific authorization, are not allowed to enter the security area", or from other sources such as company policy. Thus, the rule engine 201 can work standardly without concentration on the corresponding application which currently uses the rule-based enforcement platform 200.

Besides, the rule engine 201, the rule-based enforcement platform provides a rule engine adaptor 210. The rule engine adaptor 210 constitutes a component of the rule-based enforcement platform 200. It provides a common abstraction layer above the rule engine 201 and a common way for all context source types 301 to access the rule-based enforcement platform 200.

The rule engine adaptor 210 can be formed of the three following subcomponents. The rule engine adaptor 210 comprises a context converter component 211 which provides an access point into the rule-based enforcement platform 200 for the various context sources 301. That means that the context sources 301 can all be connected via the same communication API 302 to the rule-based enforcement platform 200, particularly to the context converter component 211 of the rule engine adaptor 210. Via this communication API 302 the context sources 301 can access the rule-based enforcement platform 200 and update their respective context information. The context converter component 211 provides that API 302.

In addition, a context converter component 211 is responsible for translating any call to this API 302 from anyone of the context sources 301 into a representation that can be interpreted by the rule engine 201. That means that the context converter component 211 translates such a call into a rule engine's fact assertion language. In case that a context source 301 is a task manager, and a piece of context information is "user Alice performed task number 3", the context source 301 will call the API 302 and provide, as parameter of that call, a data structure mapping the string "user" to the string "Alice" and the string "task-number" to the number "3". The string "user-performed-task" will also be passed as another parameter. The context converter 211 will then translate this call to an assertion statement in the rule engine's assertion language; in the case of JESS, that would be translated as "(assert (user-performed-task (user Alice) (task-number 3)))". The translated calls originating from one of the context sources 301 can thus be represented within the rule engine 201 as facts which can be handled by the rule engine 201.

The rule engine adaptor 210 further comprises a constraint converter component 212. The constraint converter component 212 works together with a further component of the rule-based enforcement platform 200, namely a constraint specification console 214. The constraint specification console 214 is generally separate from the rule engine adaptor 210, but can also be part of the rule engine adaptor 210. The role of the constraint converter component 212 is to forward constraints expressed by an application designer to the rule engine 201 so that those constraints can be enforced by the rule engine 201 when the context sources 301 update their respective context information.

The constraint specification console 214 is a component that enables an application developer, especially that one who is responsible for expressing application specific constraints, particularly security constraints, to specify constraints based on agreed-upon context sources 301. This constraint specification console 214 provides an interface to specify those constraints in the rule engine's rule language. The constraint specification console 214 already provides the constraints in the rule engine language. In the case of JESS, for example, a rule expressed as "All customers that buy more than $100 at one time will receive a 10% discount" in English language could be translated as "(customer-order (order-number ?n) (total-price ?p:>100))=> (assert( apply-discount (order-number ?n) (percent 10)))" in JESS's rule engine language. Then the constraint specification console 214 forwards those constraints specified by an application developer to the rule engine adaptor 210 so that the constraints get stored in the rule engine 201 as a set of rules which can be handled, namely applied, on corresponding facts.

The rule engine adaptor 210 further comprises a third component, namely a query converter component 213. The query converter component 213 makes a link between the constraint enforcement point 303 and the rule engine 201. The query converter 213 provides a communication API for the constraint enforcement point 303 to query about certain types of facts. Generally, these should be facts that make sense for the corresponding application that uses the rule-based enforcement platform 200 in order to enforce suitable application specific constraints.

The query converter 213 is further responsible for translating those queries into a representation that is understandable by the rule engine 201. It is possible, for example, that the constraint enforcement point 303 is a security component of a task management application. Thus, the constraint enforcement point 303 will want to know whether a particular user is allowed to perform a specific task; say, it needs to know whether "Alice is allowed to perform task 4". In order to determine that, the constraint enforcement point 303 calls the API 304 and provide, as parameter of that call, a list data structure containing the string "Alice" and the number "4". The string "is-allowed-to-perform" will also be passed as another parameter. The query converter 213 will then translate this call to a query statement in the rule engine's query language; in the case of JESS, that would be translated as "(run-query is-allowed-to-perform Alice 4)". That means that those queries should be translated into a rule engine's query language.

In addition, the query converter component 213 is responsible for translating answers to such translated queries coming back from the rule engine 201 into a data structure that is understandable by the constraint enforcement point 303. In the previous example, that data structure would be as simple as a single Boolean value, denoting whether Alice is allowed to perform task 4 or not. As another example, say, the constraint enforcement point 303 needs to know all tasks which are not forbidden to Alice, the data structure passed back by the query converter 213 would be a list comprising the id-numbers of those tasks not forbidden to Alice.

Figure 2:
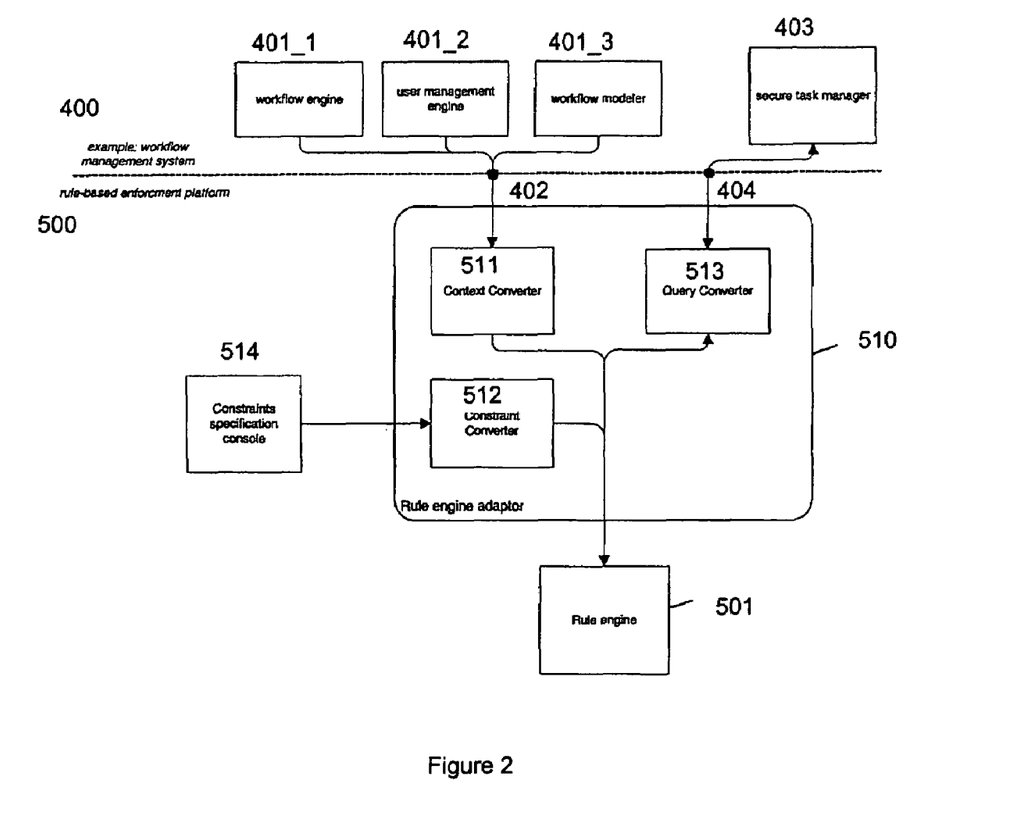
FIG. 2 shows schematically an architecture of a further embodiment of the access control system according to one aspect.

FIG. 2 shows a more specific architecture of a further embodiment of an access control system. The architecture shown in FIG. 2 can be used for enforcing dynamic separation of duty properties in a workflow management application. The workflow management application is represented in FIG. 2 by different application specific components, namely the workflow engine 401_1, a user management engine 401_2, a workflow modeler 401_3 and a secure task manager 403. The workflow engine 401_1, the user management engine 401_2 and the workflow modeler 401_3 correspond to applications specific context sources 401 providing respective context information at runtime.

The rule-based enforcement platform 500 has substantially the same structure as the rule-based enforcement platform 200 of FIG. 1. The rule-based enforcement platform 500 also concludes a constraint specification console 514, a rule engine adaptor 510 and a rule engine 501. The rule engine adaptor 510 comprises a context converter component 511, a constraint converter component 512 and a query converter component 513. All the components of the rule-based enforcement platform 500 have the same functions, respectively, as the corresponding components of the rule-based enforcement platform 200 of FIG. 1. The context converter component 511 provides a uniform communication API 402. The query converter component 513 provides a uniform communication API 404. In the example shown in FIG. 2, the relevant context sources are represented by the workflow engine 401_1, the user management engine 401_2 and the workflow modeler 401_3. The user management engine 401_2 provides context information about users that are supposed to use the workflow application 400 as well as their role within the overall organization. The workflow modeler 401_3 provides context information about the way workflows are modeled as a set of tasks, as well as which role within the organization each task is assigned to. The workflow engine 401_1 provides context information about which user performed which task in which workflow instance.

In the example shown in FIG. 2, a security administrator of the workflow management system uses the constraint specification console 514 in order to specify dynamic separation of duty constraints, in terms of tasks, models and instances that come from the context sources described above. Theses constraints are e.g. of the form "task T1 and task T2 should be performed by a different user in any workflow instance".

Furthermore, in that example, the secure task manager 403 is acting as the constraint enforcement point. This secure task manager 403 queries the rule engine adaptor 510 for facts of the form "Task T is forbidden to user U in workflow instance I".

Such a setup allows for capturing and evaluating separation properties like: "A clerk must not sign loan contract if he was involved in the prior operations preparing the contract".

Figure 3:
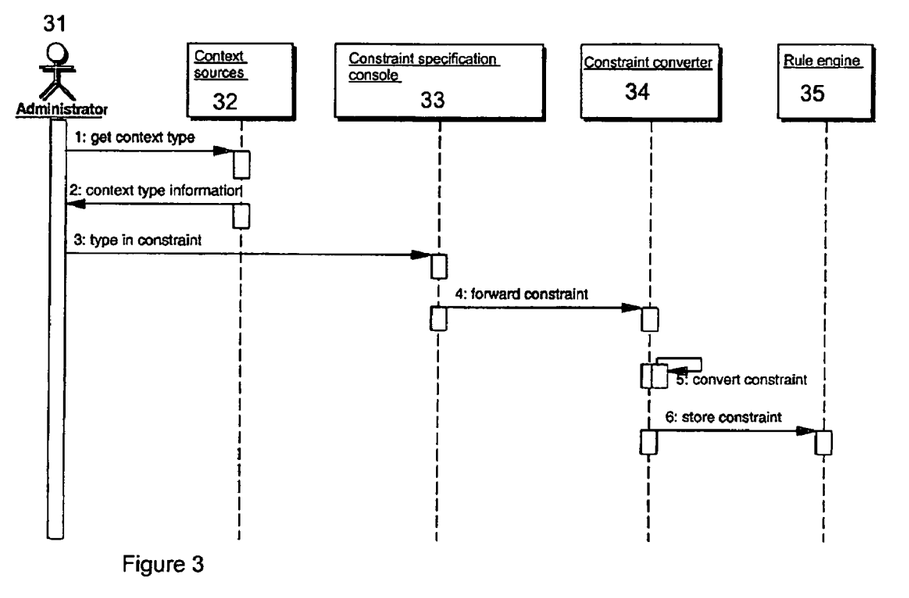
FIG. 3 shows a sequence diagram for possible constraints specification within another embodiment of the access control system according to one aspect.

FIG. 3 shows a sequence diagram for a constraint specification by means of an access control system according to one general aspect. An administrator 31 defines or identifies context sources 32 which are relevant for the application to be designed (operation 1). The identified relevant context sources 32 provide a certain type of context information on which the specification of the application specific constraints is to be based (operation 2). The administrator connects at design time to a constraint specification console 33 in order to specify application specific constraints based on the context information which will be provided at runtime by the identified relevant context sources 32 (operation 3). These constraints are forwarded by means of the constraint specification console 33 to a constraint converter component 34 which is a component of a rule engine adaptor (operation 4). The constraints are then translated by the constraint converter component 34 into rules understandable by an underlying rule engine 35 (operation 5). These translated constraints get stored in the rule engine 35 as a set of rules (operation 6).

Figure 4:
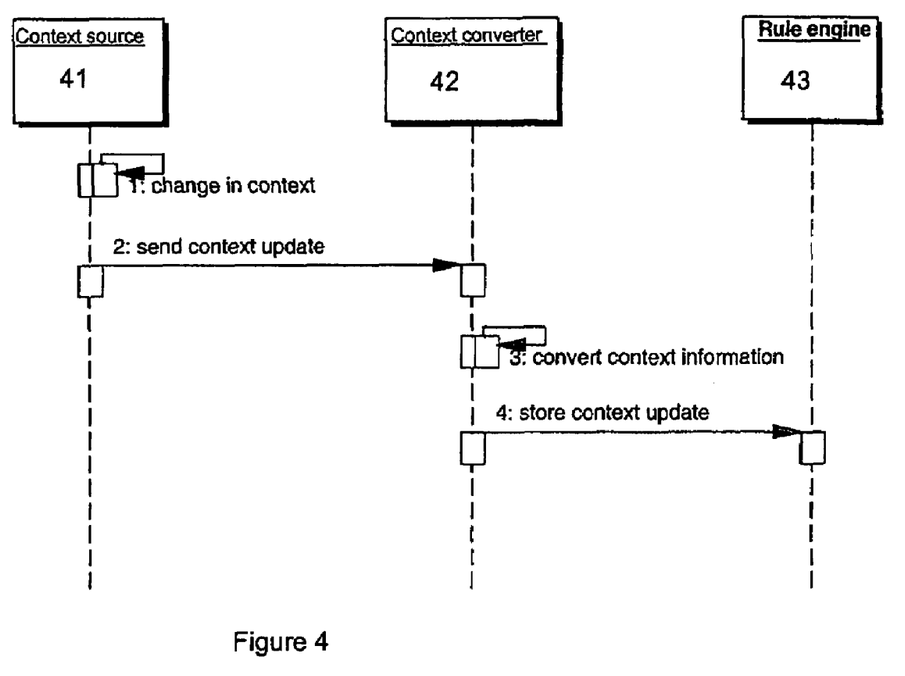
FIG. 4 shows a further sequence diagram for a possible context update performed within a further embodiment of the access control system according to one aspect.

FIG. 4 shows a sequence diagram for a context update. A context source 41 as part of an application which intends to use a rule-based enforcement platform according to a possible implementation updates its context information which corresponds to a change in its context information (operation 1). The context source 41 forwards the context information update to a context converter component 42 which is a part of a rule engine adaptor via an access point which is provided by the context converter 42 (operation 2). This access point is uniform, that is all context sources can use the same communication API to access the context converter component 42 and update their respective context information. The context converter component 42 is responsible for translating calls to this API from any context source into a representation that can be interpreted by an underlying rule engine 43. That means that the context converter component 42 has to translate the context information update originating from context source 41 into facts understandable by the rule engine 43 (operation 3) and hence facts representing current context information are stored in the rule engines' fact base (operation 4). The addition of new facts representing changes in context information fires rules that were specified at design time. These rules in turn generate new facts representing information needed to enforce respective constraints.

Figure 5:
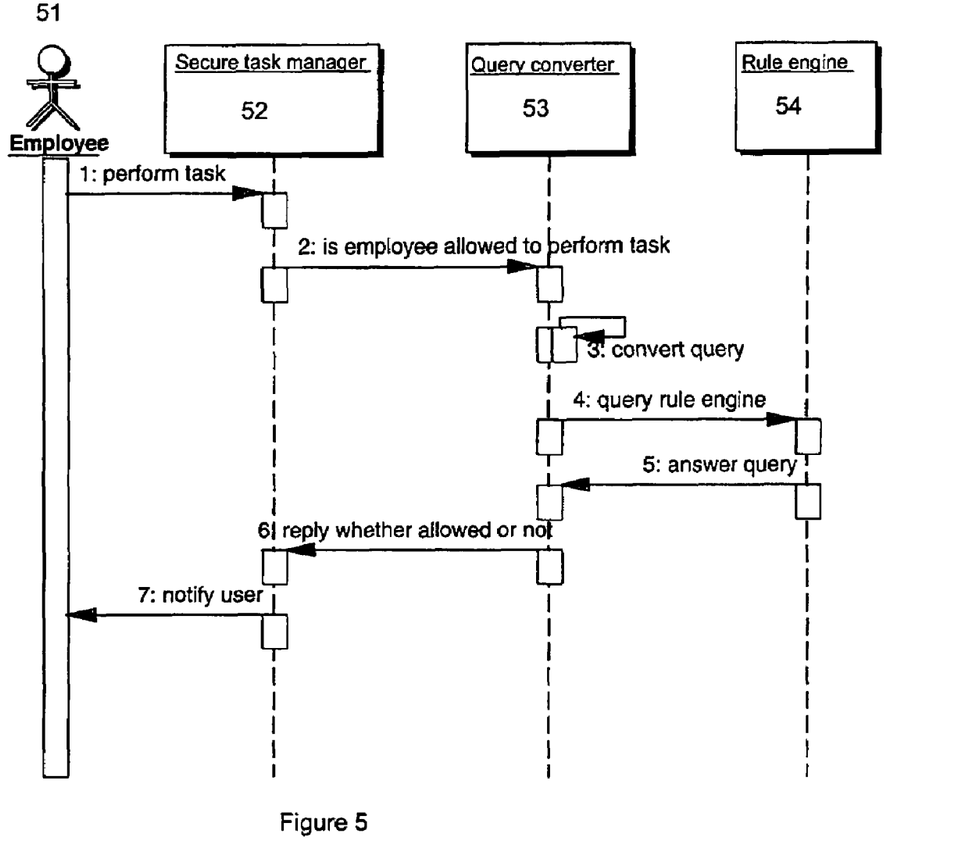
FIG. 5 shows a sequence diagram for a possible constraint enforcement realized within another embodiment of the access control system according to one aspect.

FIG. 5 shows a sequence diagram for a constraint enforcement by the example of a workflow system. An employee 51 intends to perform a certain task. Therefore, he addresses himself to a secure task manager 52 (operation 1). The secure task manager 52 communicates with a query converter component 53 which is a part of a respective rule engine adaptor (operation 2). Such communication with a query converter component 53 is achieved in a uniform manner by using an appropriate communication API. The query converter component 53 makes a link between the secure task manager 52 and a rule engine 54. It provides the API for the secure task manager 52 to query about certain types of facts, in the case shown here in form of a question "is employee 51 allowed to perform the task." The query converter component 53 translates the query originating from the secure task manager 52 into a representation that is understandable by the rule engine 54 (operation 3). The converted query is forwarded to the rule engine 54 (operation 4) which answers the translated query, the answer coming back from the rule engine 54 to the query converter component 53 (operation 5). The query converter component 53 translates now the answer into a data structure that is understandable by the secure task manager 52. The translated answer contains a reply whether the employee 51 is allowed to perform a specific task or not (operation 6). The secure task manager 51 makes now an appropriate security decision, in the present case allowing or barring the employee from performing the task in question and notifies the employee accordingly (operation 7).

The invention claimed is:

1. An access control system providing access control to at least one information resource associated with at least one application within a computer network, the access control system comprising:
   a plurality of context sources being relevant to the at least one application and providing context information;
   a constraint specification console providing an interface to specify application specific constraints based on the context sources;
   a rule engine capable of handling facts and applying inference rules on those facts, the rule engine storing the rules;
   an application specific constraint enforcement point configured to receive access requests, hence querying facts and further being responsible to make access decisions regarding the information resource based on those facts and on application specific constraints; and
   a rule engine adaptor acting as connecting component to interconnect the rule engine with the context sources, the constraint specification console and the enforcement point, respectively, and as intermediary in communication of the rule engine with the context sources, the constraint specification console and the enforcement point, respectively, so as to allow access control to the at least one information resource based on specified application specific constraints with regard to context information originating from the context sources, context information being provided by a context source being expressed as the facts within the rule engine.

2. An access control system according to claim 1, wherein the rule engine adaptor is configured to translate context information from any one of the context sources into facts that can be interpreted by the rule engine.

3. An access control system according to claim 1, wherein the rule engine adaptor is configured to translate constraints forwarded by the constraint specification console into rules that can be interpreted and appropriately applied on facts by the rule engine.

4. An access control system according to claim 1, wherein the rule engine adaptor is configured to translate queries about facts queried by the constraint enforcement point into a representation that is interpretable by the rule engine and answers to such translated queries provided by the rule engine into a representation that is interpretable by the constraint enforcement point accordingly.

5. An access control system according to claim 1, wherein the rule engine adaptor provides uniform communication interfaces for the plurality of context sources, the constraint specification console, the constraint enforcement point and the rule engine, respectively, to access the rule engine adaptor accordingly.

6. An access control system according to claim 1, wherein the rule engine adaptor comprises:
   a. a context converter component providing an access to the rule engine adaptor for the various context sources, and acting as intermediary in communication of the rule engine with any one of the context sources,
   b. a constraint converter component acting as intermediary in communication of the rule engine with the constraint specification console so as to enable the rule engine to enforce respective specified constraints when the context sources update their respective context information, and
   c. a query converter component providing an access to the rule engine adaptor for the constraint enforcement point to query about certain types of facts and acting as intermediary in communication of the rule engine with the enforcement point.

7. An access control system according to claim 1, wherein the rule engine is an off-the-shelf component, particularly JESS, comprising a fact base for storing facts representing context information originating from the context sources and a rule base for storing rules representing constraints specified and forwarded by means of the constraint specification console.

8. A rule engine adaptor applicable for access control to at least one information resource associated with at least one application within a computer network, the rule engine adaptor acting as intermediary in communication between a rule engine and various application specific context sources and an application specific constraint enforcement point, respectively, the rule engine adaptor further comprising:
   a. a context converter component providing an access to the rule engine adaptor for the various context sources which provide context information, and acting as intermediary in communication of the rule engine with any one of the context sources, the context converter translating the context information originating from one of the various context sources into facts that can be interpreted and correlated with rules by the rule engine;
   b. a constraint converter component acting as intermediary in communication of the rule engine with a constraint specification console which provides an interface to specify application specific constraints based on the context sources so as to enable the rule engine to enforce constraints when the context sources update their respective context information; and
   c. a query converter component providing an access to the rule engine adaptor for the constraint enforcement point and acting as intermediary in communication of the rule engine with the constraint enforcement point so as to enable the constraint enforcement point to make access decisions in reaction to a certain query.

9. A rule engine adaptor according to claim 8, wherein the rule engine adaptor is application independent and represents a common abstraction layer above the rule engine and a common way for all relevant components specific for a certain application to access the rule engine adaptor.

10. A rule-based enforcement platform applicable for access control to at least one information resource associated with at least one application within a computer network, the platform comprising:
   a. a rule engine being capable of handling facts and applying inference rules on those facts, the rule engine storing the rules;
   b. a constraint specification console providing an interface to specify application specific constraints based on agreed-upon application specific context sources; and c. a rule engine adaptor providing an access point to the constraint specification console so as to be capable of forwarding constraints specified within the constraint specification console to the rule engine so that the constraints get stored in the rule engine as a set of rules, uniform access points for application specific context sources to access the platform so as to enable the application specific context sources to communicate with the rule engine such that context information provided by the context sources being expressed as facts within the rule engine and an access point for an application specific constraint enforcement point to access the platform so as to allow access control to the at least one information resource based on the application specific constraints with regard to context information originating from the context sources.

11. A rule-based enforcement platform according to claim 10, wherein the rule engine adaptor comprises:
   a. a context converter component providing an access to the rule engine adaptor for the application specific context sources, and acting as intermediary in communication of the rule engine with any one of the context sources;
   b. a constraint converter component acting as intermediary in communication of the rule engine with the constraint specification console so as to enable the rule engine to enforce constraints when the context sources update their respective context information; and
   c. a query converter component providing an access to the rule engine adaptor for the constraint enforcement point and acting as intermediary in communication of the rule engine with the constraint enforcement point.

12. A rule-based enforcement platform according to claim 10, which is application independent.

13. A computer-implemented method for performing access control to at least one information resource associated with at least one application within a computer network, the computer-implemented method comprising:
   receiving identified application relevant context sources;
   receiving specified constraints, specified by means of a constraint specification console, the constraints being based on context information that are provided by the identified relevant context sources;
   translating the specified constraints into rules understandable by an appropriate rule engine;
   forwarding the translated constraints to the rule engine so that the translated constraints get stored in the rule engine as a set of rules;
   translating, at runtime by means of a rule engine adaptor, context information originating from the identified relevant context sources into facts that can be interpreted and appropriately correlated with the respective rules by and stored in the rule engine; and
   querying such facts, in case of need, by means of an application specific constraint enforcement point from the rule engine via the rule engine adaptor so as to enable the constraint enforcement point to make appropriate enforcement decisions.

14. A computer-implemented method according to claim 13, wherein the rule engine is chosen as an off-the-shelf component that is capable of handling facts and applying inference rules on those facts and used in such a way that context information originating from the identified relevant context sources is represented as facts and the specified constraints are expressed as rules within the rule engine.

15. A computer program product with a computer-readable storage medium and a computer program stored on the computer-readable storage medium suitable for carrying out a computer-implemented method when the computer program is run on a computer, the computer implemented method comprising:
   receiving identified application relevant context sources;
   receiving specified constraints, specified by means of a constraint specification console, the constraints being based on context information that are provided by the identified relevant context sources;
   translating the specified constraints into rules understandable by an appropriate rule engine;
   forwarding the translated constraints to the rule engine so that the translated constraints get stored in the rule engine as a set of rules;
   translating, at runtime by means of a rule engine adaptor, context information originating from the identified relevant context sources into facts that can be interpreted and appropriately correlated with the respective rules by and stored in the rule engine; and
   querying such facts, in case of need, by means of an application specific constraint enforcement point from the rule engine via the rule engine adaptor so as to enable the constraint enforcement point to make appropriate enforcement decisions.

16. A computer-readable storage medium with a computer program stored thereon, the computer program comprising a program code which is suitable for carrying out a computer-implemented method when the computer program is run on a computer, the computer-implemented method comprising:
   receiving identified application relevant context sources;
   receiving specified constraints, specified by means of a constraint specification console, the constraints being based on context information that are provided by the identified relevant context sources;
   translating the specified constraints into rules understandable by an appropriate rule engine;
   forwarding the translated constraints to the rule engine so that the translated constraints get stored in the rule engine as a set of rules;
   translating, at runtime by means of a rule engine adaptor, context information originating from the identified relevant context sources into facts that can be interpreted and appropriately correlated with the respective rules by and stored in the rule engine; and
   querying such facts, in case of need, by means of an application specific constraint enforcement point from the rule engine via the rule engine adaptor so as to enable the constraint enforcement point to make appropriate enforcement decisions.

* * * * *